United States Patent
Nyce et al.

(10) Patent No.: US 6,707,290 B2
(45) Date of Patent: *Mar. 16, 2004

(54) MAGNETOSTRICTIVE LINEAR DISPLACEMENT TRANSDUCER FOR A VEHICLE STRUT SUSPENSION

(75) Inventors: David S. Nyce, Apex, NC (US); Arnold F. Sprecher, Jr., Raleigh, NC (US); David Edward Shoff, Raleigh, NC (US)

(73) Assignee: MTS Systems Corporation, Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/321,176

(22) Filed: May 27, 1999

(65) Prior Publication Data

US 2003/0197502 A1 Oct. 23, 2003

Related U.S. Application Data

(63) Continuation-in-part of application No. 08/828,193, filed on Mar. 21, 1997, now Pat. No. 5,952,823.
(60) Provisional application No. 60/013,985, filed on Mar. 22, 1996.

(51) Int. Cl.$^7$ .............................. G01B 7/14; H03H 9/22
(52) U.S. Cl. ............................... 324/207.13; 324/207.24
(58) Field of Search ........................ 324/207.13, 207.22, 324/207.24; 73/290 V, 313, 314

(56) References Cited

U.S. PATENT DOCUMENTS

| | | | | |
|---|---|---|---|---|
| 4,107,604 A | * | 8/1978 | Bernier | 324/207.2 |
| 4,883,150 A | * | 11/1989 | Arai | 324/207.24 |
| 5,036,275 A | * | 7/1991 | Munch et al. | 324/207.24 |
| 5,359,288 A | * | 10/1994 | Riggs et al. | 324/207.22 |
| 5,545,984 A | * | 8/1996 | Gloden et al. | 324/207.13 |
| 5,619,133 A | * | 4/1997 | Shank et al. | 324/207.24 |
| 5,717,330 A | * | 2/1998 | Moreau et al. | 324/207.13 |
| 5,952,823 A | * | 9/1999 | Nyce et al. | 324/207.13 |

* cited by examiner

Primary Examiner—Walter E. Snow
(74) Attorney, Agent, or Firm—David M. Ostefld

(57) ABSTRACT

A vehicle suspension strut is disclosed that includes a housing having a chamber and a piston slidably disposed in the chamber. A piston rod is connected to the piston and extends out of the housing. The piston rod includes a bore extending longitudinally therein. A magnetostrictive transducer provides an output signal indicative of the piston position with respect to the housing. The magnetostrictive transducer includes a magnetostrictive waveguide disposed in the bore and a magnet joined to the housing that is operably coupled to the magnetostrictive waveguide and the magnetostrictive waveguide abruptly terminates at one end.

28 Claims, 6 Drawing Sheets

MAGNETOSTRICTIVE LINEAR DISPLACEMENT TRANSDUCER FOR A VEHICLE STRUT SUSPENSION

CROSS REFERENCE TO RELATED APPLICATIONS

This application is a continuation in part of U.S. application Ser. No. 08/828,193, filed Mar. 21, 1997, now U.S. Pat. No. 5,952,823, which claims the benefit of U.S. Provisional Application No. 60/013,985, entitled "Magnetostrictive Linear Displacement Transducer for a Shock Absorber," filed Mar. 22, 1996.

BACKGROUND OF THE INVENTION

1. Field of the Invention

The present invention relates to a sensor to measure the position and velocity of movement of a piston in a cylinder. More particularly, the present invention relates to a magnetostrictive linear displacement transducer for use in a vehicle suspension strut.

2. Background Art

Various devices have been advanced to measure the distance traveled by a piston in a cylinder. One common application is determining the movement of the piston in a hydraulic, pneumatic, or hydro-pneumatic vehicle strut suspension, where the piston moves axially in a cylinder filled with at least one damping medium. See U.S. Pat. Nos. 4,502,006; 4,638,670; and 5,233,293, each of which discloses a displacement sensor to perform this function. None of the devices so far advanced has been widely accepted in the automotive industry. Although many systems can accurately measure motion of a piston in a cylinder or linear displacement or angular displacement, a simple transducer that can be easily incorporated into, for example, the strut suspension system to keep manufacturing costs down is still desired by many.

BRIEF SUMMARY OF THE INVENTION

A vehicle suspension strut is disclosed which includes a housing having a chamber and a piston slidably disposed in the chamber. A piston rod is connected to the piston and extends out of the housing. The piston rod includes a bore extending longitudinally therein. A magnetostrictive transducer provides an output signal indicative of the position and/or velocity of the piston with respect to the housing. The magnetostrictive transducer includes a magnetostrictive waveguide disposed in the bore and a magnet joined to the housing that is operably coupled to the magnetostrictive waveguide.

Another aspect of the present invention is a magnetostrictive transducer having a waveguide secured by a suspension sleeve fully surrounding the waveguide for use as automotive devices for applications requiring linear and/or angular measurement such as brake peddle position, steering wheel position, throttle position, mirror position and air valve position. The suspension sleeve and the waveguide are disposed in an inner cavity of an enclosure tube. In the preferred embodiment, the present invention further includes pins or connectors to electrically connect the waveguide assembly to an electric circuit that generates electric pulses and provides an output signal corresponding to, for example, the time required for torsional strain wave pulses to be received by a coil. A damping element is secured to the waveguide with heat shrinkable tubing or some other means, and dampens strain pulses not used by the electrical circuit. The suspension sleeve also serves to mechanically isolate the waveguide assembly from shock, vibration and contact with the enclosure tube.

BRIEF DESCRIPTION OF THE DRAWINGS

For a further understanding of the nature and objects of the present invention, reference should be made to the drawings in which like parts are given like reference numbers and wherein.

DETAILED DESCRIPTION OF THE INVENTION

Figure 1:
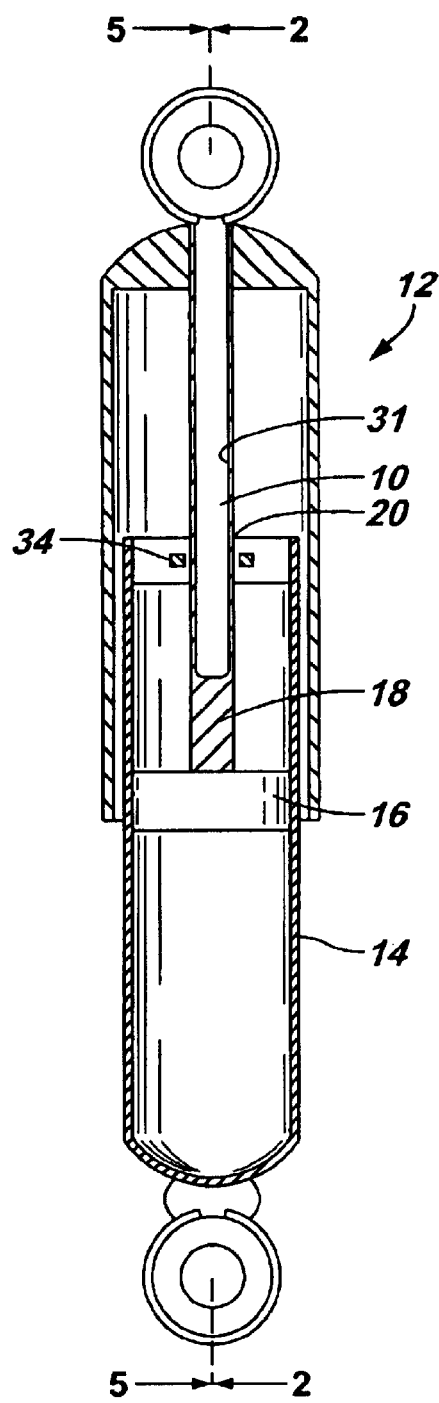
FIG. 1 is a schematic sectional view of a vehicle suspension strut having a magnetostrictive transducer of the present invention.

FIG. 1 illustrates a magnetostrictive transducer 10 of the present invention incorporated in a vehicle suspension strut illustrated schematically at 12. As is well known, a vehicle suspension strut 12 includes a cylinder 14 and a piston 16. A piston rod 18 is secured to the piston 16 and extends through a sealed aperture 20 provided on an end of the cylinder 14. The piston rod 18 connects to a frame member, not shown, of a vehicle, while the cylinder 14 is connected to a frame portion supporting a tire and wheel assembly, also not shown. The vehicle suspension strut 12 minimizes acceleration between the frame portions of the vehicle. As will be described below, the magnetostrictive transducer 10 provides a convenient sensor to monitor the position and/or velocity of the piston 16 with respect to the cylinder 14.

Figure 2:
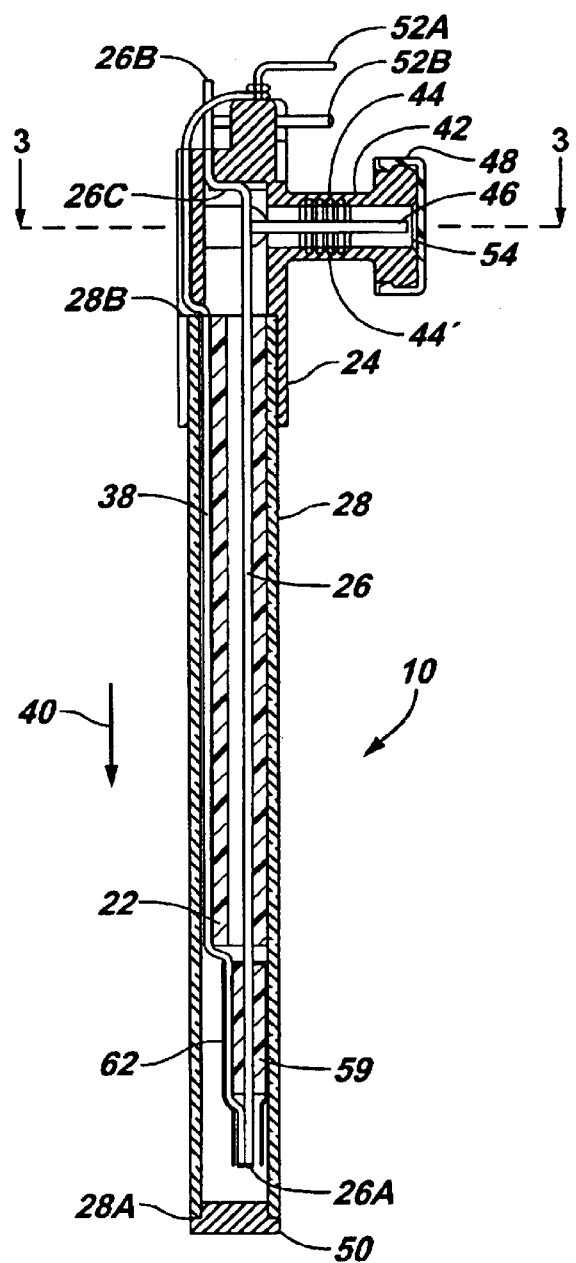
FIG. 2 is a cross-sectional view taken along section lines 2—2 of FIG. 1.

Referring to FIG. 2, the magnetostrictive transducer 10 includes waveguide 26, having ends 26A and 26B, that is protected by a plastic or other non-conducting material enclosure tube 28. Enclosure tube 28 is bonded to and mounted on a bracket 24 on near end 28B and preferably spin welded or otherwise sealed with an end cap 50 on remote end 28A. A suspension sleeve 22 surrounds waveguide 26 to securely fix the position of waveguide 26 within enclosure tube 28 without applying excessive physical pressure on waveguide 26. Excessive pressure applied to waveguide 26 by any means of positioning the waveguide 26 within the enclosure tube 28 will restrict the microscopic movement (magnetostrictive response) resulting from the application of an electrical interrogation pulse, decreasing the amplitude of the torsional strain wave that is detected and used for determination of the longitudinal displacement of a position magnet 34, such as a doughnut magnet, joined in the cylinder 14. If the amplitude of the torsional strain wave diminishes below a predetermined threshold, the magnetostrictive transducer 10 will not function. Intermediate amplitudes of the torsional strain wave cause less accurate position measurements.

As shown in FIG. 1 and FIG. 2, enclosure tube 28 is disposed in a longitudinal bore 31 provided in the piston rod 18. The position magnet 34 (FIG. 5), joined to the cylinder 14 is oriented such that the magnetic field generated by the position magnet 34 passes through the piston rod 18, and enclosure tube 28 to waveguide 26. Enclosure tube 28 is preferably constructed from non-conducting material which has a low co-efficient of linear thermal expansion, such as less than 20 ppm per degree centigrade. The low thermal co-efficient of expansion is useful by minimizing the length of bore 31 and thus the overall strut length (FIG. 1) as well as minimizing the distance between end 26A and cap 50 (FIG. 2).

A return conductor 38 is electrically connected, such as by a laser weld or other mechanism, to the waveguide 26 at end 26A of waveguide 26. Return conductor 38 completes the electrical circuit as is necessary to provide an electrical path for the electric current pulse applied to the waveguide 26 to interrogate the magnetostrictive transducer 10 to make a time or distance measurement.

The bracket 24 incorporates a bobbin 42 onto which numerous turns of small diameter insulated copper wire are wound, forming a coil 44. Return conductor 38 electrically interconnects with external circuitry (not shown) through an interconnecting pin 52A. Waveguide 26 electrically interconnects with external circuitry (not shown) through an interconnecting pin 52B by welding, soldering, braising, crimping, glueing or other suitable means, but preferably welding. Bracket 24 interrelates coil 44, waveguide 26, enclosure tube 28, return conductor 38, and electrically interconnecting pins 52A and 52B. Return conductor 38 is preferably connected to pin 52A by inductive heating for soldering to minimize heating the surrounding area.

Figure 3:
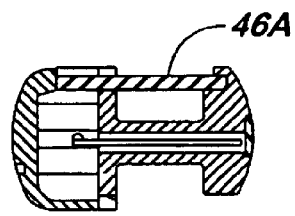
FIG. 3 is a cross-sectional view taken along section lines 3—3 of FIG. 2.
Figure 5:
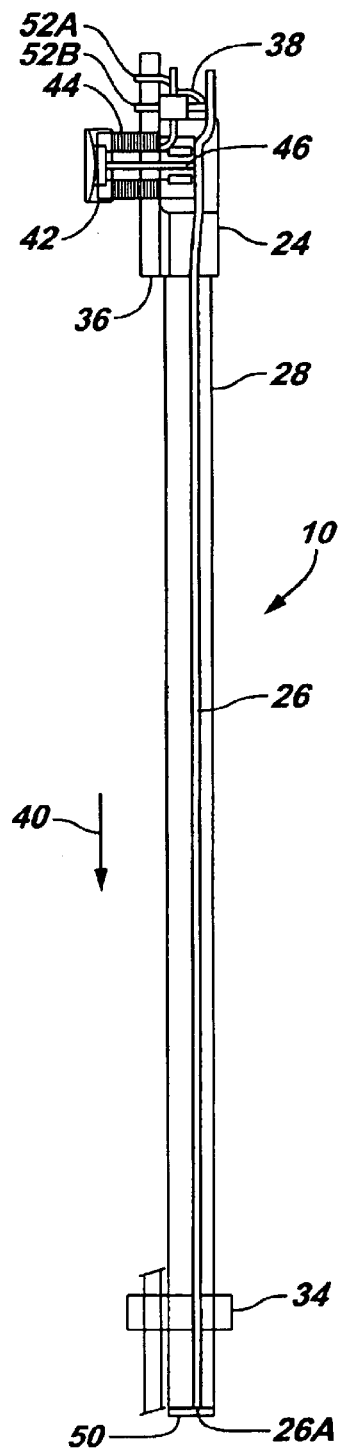
FIG. 5 is a cross-sectional, schematic view generally taken along section lines 5—5 of FIG. 1 but including a position magnet.
Figure 6:
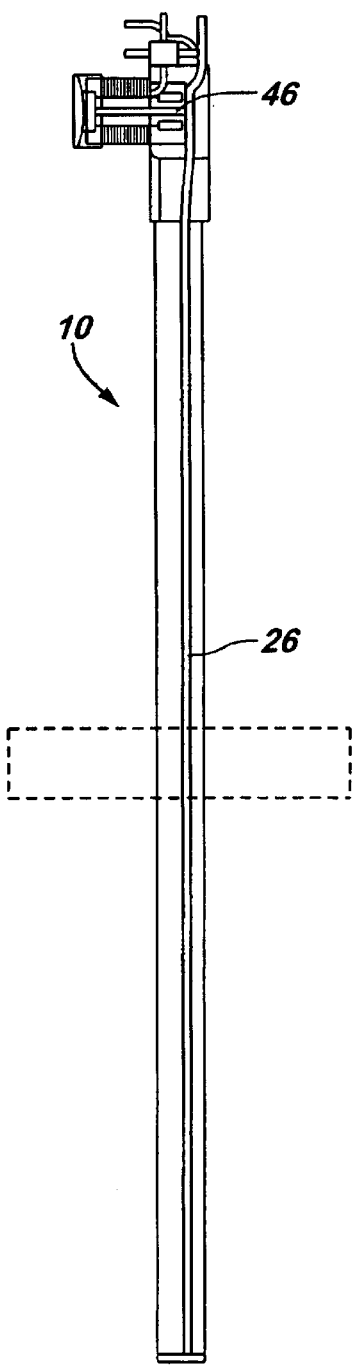
FIG. 6 is a cross-sectional, schematic view generally taken along section lines 5—5 of FIG. 1 but including a position magnet.
Figure 7:
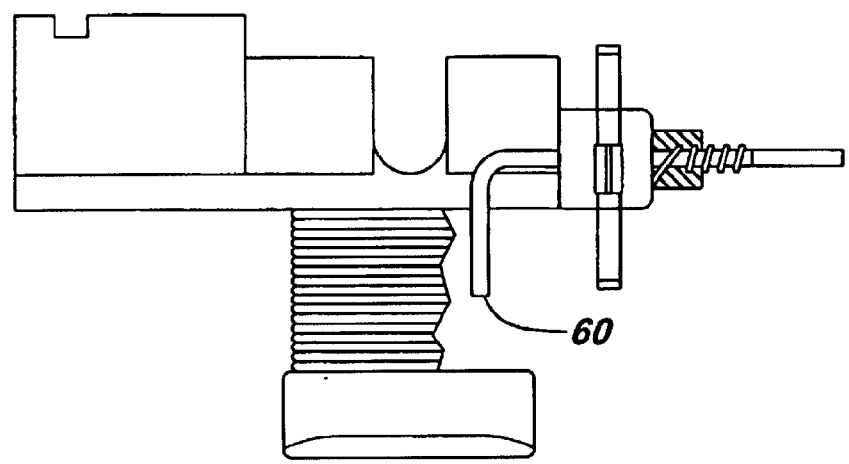
FIG. 7 is a side view partly in section of the upper portion of the magnetostrictive transducer.

A pulse generator (not shown) provides a stream of electric pulses, each of which is also provided to a signal processing circuit (not shown) for timing purposes. Referring to FIG. 5, when an electric pulse is applied to the waveguide 26 with a current in a direction indicated by arrow 40, a magnetic field is formed surrounding waveguide 26. Interaction of this field with the magnetic field from a position magnet 34 causes a torsional strain wave pulse to be launched in the waveguide 26 in both directions away from the position magnet 34. A sensing tape 46 is joined to the waveguide 26 proximate the end 26B and extends into the coil bobbin 44 forming a mode converter 44'. The coil bobbin 44 has an opening 54 at its end away from the waveguide 26. This opening 54 is sealed for protection against the introduction of foreign matter by a tape cap 48. The strain wave causes a dynamic effect in the permeability of the sensing tape 46 which is biased with a permanent magnetic field by bias magnet 46A, as shown in FIG. 3.

Figure 8:
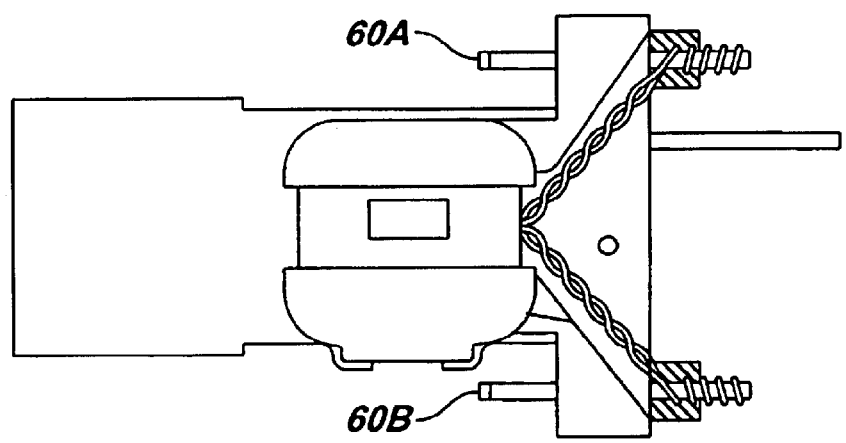
FIG. 8 is a plan view of the apparatus of FIG. 7.
Figure 9:
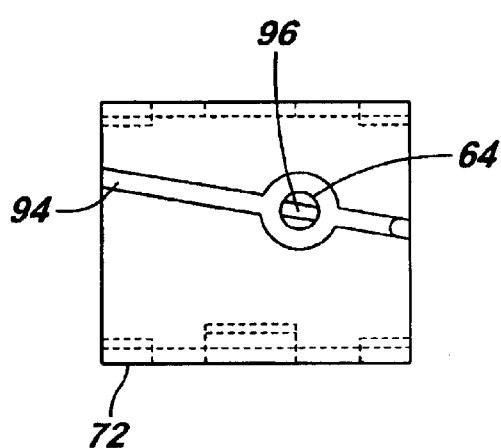
FIG. 9 is a plan view of the bobbin cap of the present invention.
Figure 10:
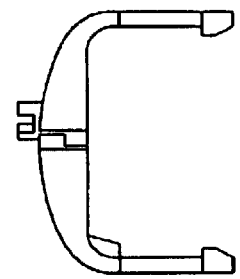
FIG. 10 is a side view of the bobbin cap of the present invention.
Figure 11:
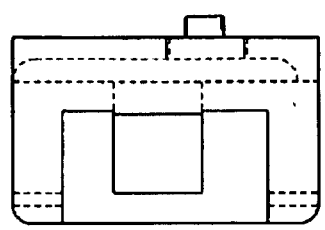
FIG. 11 is a front view of the bobbin cap of the present invention.

The dynamic effect in the magnetic field of the coil 44 due to the strain wave pulse results in an output signal from the coil 44 that is provided to the signal processing circuit (not shown) through a first connecting pin 60A and a second connecting pin 60B illustrated in FIG. 8. Referring again to FIG. 5, by comparing the time of application of a particular electric pulse and a time of return of a sonic torsional strain wave pulse back along the waveguide 26, the signal processing circuit (not shown) can calculate a distance of the position magnet 34 from the sensing tape 46. By processing the rate of change of the distance between the position magnet 34 and the sensing tape 46, the signal processing circuit (not shown) can calculate the relative velocity of the movement of the position magnet 34 along the waveguide 26. The signal processing circuit (not shown) provides an output signal, either digital or analog, which is proportional to the calculated distance or velocity.

The waveguide 26 is a solid magnetostrictive alloy that can conduct electric current. A suitable magnetostrictive alloy is a nickel-iron alloy of approximately 30% to 50% nickel. Damping is provided on the waveguide 26 to control propagation of the strain wave pulse and mechanically isolate the waveguide 26 from shock and vibration. A damping element 59 is illustrated in FIG. 2. The damping element 59 intentionally limits the propagation of one of the strain wave pulses. When the electric pulse forms a magnetic field surrounding the waveguide 26, interaction of this field with the magnetic field from the position magnet 34 causes a torsional strain wave pulse to be launched in the waveguide 26 in both directions away from the position magnet 34. A first strain wave pulse propagates down the waveguide 26 toward the sensing tape 46. A second strain wave pulse propagates up the waveguide 26 away from the sensing tape 46. The damping element 59 attenuates or dampens the second strain wave pulse so that it is not reflected back down the waveguide 26, potentially causing erroneous position readings in the output.

The damping element 59 can be made of a suitable braided material that is attached to the waveguide 26. In the preferred embodiment, the damping element 59 is secured to the waveguide 26 with a portion of heat shrink tubing 62, as illustrated in FIG. 2. It should be understood that the stroke or active sensor region of the magnetostrictive transducer 10 is defined by a portion of the waveguide 26 extending between the damping element 59 and the sensing tape 46. To maximize the electrical stroke of the magnetostrictive transducer 10 and minimize the overall length of the magnetostrictive transducer 10, the damping element 59 is disposed on a remote end 26A of waveguide 26. A braided damping element as used in the preferred embodiment is the subject matter of U.S. Pat. No. 5,545,984 to Gloden et al., which is assigned to the same assignee as this application.

Figure 4:
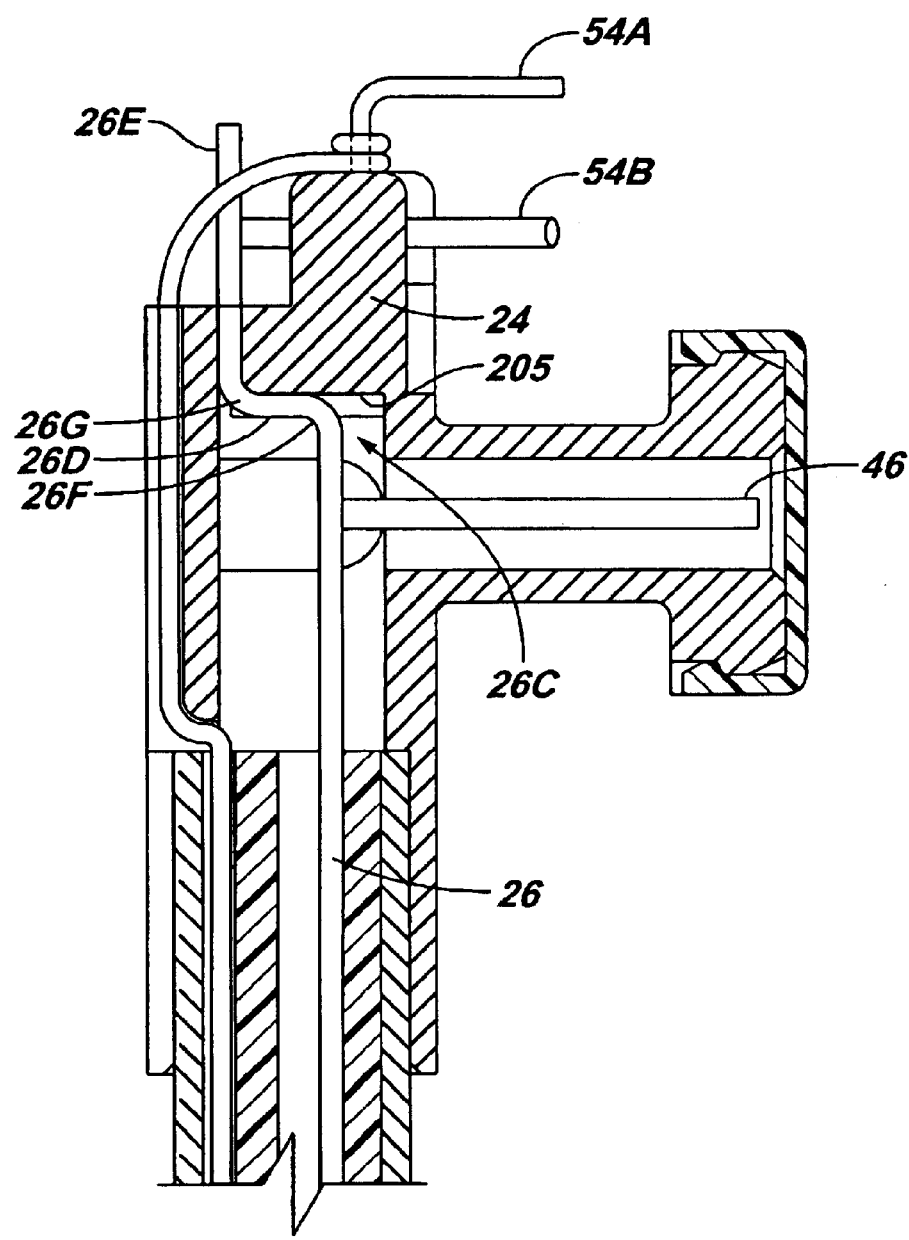
FIG. 4 is an enlarged view of the upper portion of FIG. 2.

Waveguide 26 is bendable but also substantially rigid such that it retains its shape. A unique and novel configuration of the waveguide 26 in the present invention is a Z-bend 26C at near end 26B to rachet 24 with a first abrupt bend 26F and a second abrupt 26G. The first abrupt bend 26F (FIG. 4) provides a means for reflecting the first strain wave pulse, as described below. The desirability of reinforcing the signal amplitude of the first strain wave pulse by reflection is the subject matter of U.S. Pat. No. 4,952,873 to Tellerman, which is assigned to the same assignee as this application. If the distance between the sensing tape 46 and the first abrupt bend 26F is substantially the same distance as one-half of the wavelength of the first strain wave pulse, the signal detected by the sensing tape 46 will be reinforced by in-phase addition of the reflected portion of the signal to the non-reflected portion of the signal. The reinforced pulse significantly improves the signal-to-noise ratio of the transducer, resulting in higher immunity to errors induced by external noise sources. The abrupt bend is to have an upset, which upset is an abrupt impedance change resulting from a change in macro geometry, such as a change of moment of inertia. The increase in the angle of the abrupt bend lessens the sharp tooling requirement to insure the appropriate change in moment of inertia. Therefore, it is preferable to have an abrupt bend of 85° to 95°. Further, the abrupt bend enhances manufacturing by enhancing contact between the waveguide 26 and plastic surface 205. Thus, it is preferable to use an angle of approximately 89°. Alternatively, an anchor may be used for better performance.

The use of the Z-bend 26C constitutes a significant improvement in manufacturability over previous methods of creating controlled reflections of the first strain wave pulse. A brass or similar anchor is used in the device that is the subject matter of U.S. Pat. No. 5,590,091 to Gloden et al., which is assigned to the same assignee as this application. The brass reflection collar used at the remote end of a transducer and detailed in U.S. Pat. No. 5,017,867 to Dumais et al. must be installed by hand and is secured with a set screw. In the magnetostrictive transducer industry, transducers have typically been built in quantities of a few thousand per month. Because of the high quantity demands of the automotive industry, a primary market for the present invention, the installation of a brass or similar reflecting anchor using conventional techniques is time and cost prohibitive. The Z-bend 26C of the present invention for the first time permits high-volume manufacturing of magnetostrictive transducers using automated machinery.

The Z-bend 26C in waveguide 26 permits the waveguide 26 to be "snap fitted" into the bracket 24 for durability, ease of manufacturing, and low cots. A center portion 26D of the Z-bend in the waveguide 26 securely anchors and rigidly fixes the waveguide 26 into the bracket 24. A shorter outward portion 26E after the Z-bend 26C is welded to interconnecting pin 52B that provides the electrical interconnection of the magnetostrictive transducer 10 to electronic circuitry (not shown). Referring to FIG. 5, electrical interconnection of magnetostrictive transducer 10 with external circuitry is accomplished with a printed circuit board 36. Because of the minimal conductor length necessary to interconnect the magnetostrictive transducer 10 with printed circuit board 36, the amount of ringing (continuing oscillations occurring for a period of time following an electrical or magnetic stimulation of the reactance of the coil 44) is minimized. The reduced ringing permits more accurate position measurements with the position magnet 34 being positioned closer to the near end, thereby allowing the overall mechanical length of the magnetostrictive transducer 10 to be reduced without requiring the electrical length to be reduced, a major objective of the present invention.

As previously stated, return conductor 38 provides a current return path for electric interrogation pulses applied to the waveguide 26 by an electronic circuit (not shown). A feature of the present invention is that the return conductor 38 can be either insulated or uninsulated. Therefore, in the preferred embodiment, the enclosure tube 28 is an electrical insulator, as is the suspension sleeve 22. For manufacturing efficiency, the return conductor 38 is readily sandwiched between the enclosure tube 28 and the suspension sleeve 22 without the possibility that the return conductor 38 will short against electrical components causing a failure of the magnetostrictive transducer 10.

Another feature of the present invention is an integral strain relief 64 for the return conductor 38. In previous designs, transducers have failed from return conductors that have broken at their points of electrical interconnection with other transducer circuitry. This problem is typically caused by small movement of the return conductor 38 caused by shock and vibration induced into the magnetostrictive transducer 10 resulting in a fatigued segment of the return conductor 38 that eventually severs. Without compromising the compactness of the magnetostrictive transducer 10, the present invention uses a bracket base cap 72 with an integral strain relief 64. After return conductor 38 is positioned within a channel 94 in the bracket base cap 72, a slotted stub 96 is melted such that molten plastic flows around and engages the return conductor 38. When the plastic cools and hardens, it surrounds and securely anchors return conductor 38 to relieve the stress caused by the return conductor 38 pulling against the circuit board pin 52A and eventually breaking.

All of the features of a particular preferred embodiment of the assembly are not shown in the above disclosure in order to emphasize the generality of the disclosure.

Because many varying and different embodiments may be made within the scope of the invention concept taught herein which may involve many modifications in the embodiments herein detailed in accordance with the descriptive requirements of the law, it is to be understood that the details herein are to be interpreted as illustrative and not in a limiting sense.

What is claimed is:

1. A vehicle strut suspension, comprising:
   a. a housing having a chamber;
   b. a piston slidably disposed in the chamber;
   c. a rod connected to the piston and extending out of the housing, the rod having a bore extending longitudinally therein; and
   d. a magnetostrictive transducer comprising:
      i. a magnetostrictive waveguide disposed in the bore;
      ii. a magnet operably coupled to the magnetostrictive waveguide;
      iii. a return wire connected to said magnetostrictive waveguide; and
      iv. an abrupt change in acoustic impedance of said waveguide.

2. The vehicle strut suspension of claim 1, wherein said magnetostrictive transducer includes a transducer housing disposed in the bore and supporting the magnetostrictive waveguide off center.

3. The vehicle strut suspension of claim 1, wherein said abrupt change in acoustic impedance includes an abrupt change in the geometric configuration of said waveguide.

4. The vehicle strut suspension of claim 3, wherein said abrupt change in the geometric configuration includes a deformation of said waveguide.

5. The vehicle strut suspension of claim 4, wherein said deformation of said waveguide is a bending deformation of said waveguide.

6. The vehicle strut suspension of claim 1, wherein there is further included a damping element, said damping element surrounding said magnetostrictive waveguide at the end of said magnetostrictive waveguide having a junction with said return wire.

7. The vehicle strut suspension of claim 6, wherein said damping element is held in place by heat shrink tubing.

8. The vehicle strut suspension of claim 7, wherein said heat shrink is positioned to provide strain relief for said return wire.

9. The vehicle strut suspension of claim 1, wherein said return wire is uninsulated and there is further included a suspension sleeve surrounding said magnetostrictive waveguide, said suspension sleeve being adjacent to said return wire, being conductive and uninsulated.

10. The vehicle strut suspension of claim 1, wherein there is further included a strain relief, said strain relief relieving strain on said return wire.

11. The vehicle strut suspension of claim 1, wherein said magnet is joined to said housing.

12. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. a magnetostrictive waveguide disposed in the bore;
  ii. a magnet operably coupled to the magnetostrictive waveguide;
  iii. a return wire connected to said magnetostrictive waveguide; and
  iv. a Z-bend of said waveguide forming an abrupt change in acoustic impedance.

13. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. an enclosure disposed in the bore;
  ii. a magnetostrictive waveguide disposed in the enclosure;
  iii. a magnet operably coupled to the magnetostrictive waveguide;
  iv. a return wire connected to said magnetostrictive waveguide; and
  v. wherein said enclosure has a low co-efficient of thermal linear expansion.

14. The vehicle strut suspension of claim 13, wherein the low co-efficient of thermal linear expansion is at or less than 20 ppm per degree centigrade.

15. The vehicle strut suspension of claim 13, wherein said enclosure comprises non-conducting material.

16. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. a magnetostrictive waveguide disposed in the bore;
  ii. a magnet operably coupled to the magnetostrictive waveguide;
  iii. a return wire connected to said magnetostrictive waveguide; and
  iv. a pin, said waveguide terminating at and attached to said pin, said waveguide having a tuning portion to minimize ringing by destructive phase shift of the reflected signal along said waveguide.

17. The vehicle strut suspension of claim 16, wherein said tuning portion of said waveguide is tuned in conjunction with the reflection of said pin.

18. The vehicle strut suspension of claim 17, wherein said waveguide is welded to said pin.

19. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. a magnetostrictive waveguide disposed in the bore;
  ii. a magnet operably coupled to the magnetostrictive waveguide;
  iii. a return wire connected to said magnetostrictive waveguide; and
  iv. said return wire being uninsulated and being attached to said waveguide.

20. A vehicle strut suspension of claim 19, wherein said attachment is by a laser weld.

21. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. a magnetostrictive waveguide disposed in the bore;
  ii. a magnet operably coupled to the magnetostrictive waveguide;
  iii. a return wire connected to said magnetostrictive waveguide; and
  iv. said return wire includes heat shrink applied to said return wire, said heat shrink holding said return wire in place.

22. A vehicle strut suspension, comprising:
 a. a housing having a chamber;
 b. a piston slidably disposed in the chamber;
 c. a rod connected to the piston and extending out of the housing, the rod having a bore extending longitudinally therein; and
 d. a magnetostrictive transducer comprising:
  i. an enclosure disposed in the bore;
  ii. a magnetostrictive waveguide disposed in the enclosure;
  iii. a magnet operably coupled to the magnetostrictive waveguide;
  iv. a return wire connected to said magnetostrictive waveguide; and
  v. wherein there is included a cap at the end of the enclosure, the enclosure being non-conducting and the cap being attached to said enclosure.

23. The vehicle strut suspension system of claim 22, wherein the attachment is by a weld.

24. An automotive magnetostrictive device for measuring a variable with respect to an automotive vehicle, comprising:
 a. a spacing corresponding to the range of measurement for the variable;
 b. a magnetostrictive transducer mounted in the automotive vehicle, comprising:
  i. a magnetostrictive waveguide disposed in and attached to said spacing;
  ii. a device for affecting a property of said magnetostrictive waveguide proportional to the current amount of said range of the variable assumed by the variable;
  iii. a mode converter for measuring said property; and
  iv. a signal generated by said mode converter representative of said current amount.

25. A vehicle strut suspension, comprising:
 g. a housing having a chamber;
 h. a piston slidably disposed in the chamber;
 i. a rod connected to the piston and extending out of the housing, the rod having a bore extending longitudinally therein; and j. a transducer comprising:
   (1) an enclosure disposed in the bore;
   (2) a detector disposed in the enclosure;
   (3) a magnet having a substantially uniform magnetic field intensity, operably coupled to the detector said detector sensing said uniform field intensity at locations along said detector; and
   (4) wherein said detector measures the continuous range of position of said piston.

26. A vehicle strut suspension, comprising:
   a. a housing having a chamber;
   b. a piston slidably disposed in the chamber;
   c. a rod connected to the piston and extending out of the housing, the rod having a bore extending longitudinally therein; and
   d. a transducer comprising:
      (1) an enclosure disposed in the bore;
      (2) a detector disposed in the enclosure;
      (3) a magnet operably coupled to the detector; and
      (4) wherein said enclosure has a low co-efficient of thermal linear expansion and said low co-efficient of thermal linear expansion is at or less than 20 ppm per degree centigrade.

27. The vehicle strut suspension of claim 25, wherein said enclosure comprises non-conducting material.

28. An automotive device for measuring a variable with respect to an automotive vehicle, comprising:
   k. a spacing corresponding to the range of measurement for the variable;
   l. a transducer mounted in the automotive vehicle, comprising:
      (1) a detector disposed in and attached to said spacing;
      (2) a device for affecting a property of said detector proportional to the current amount of said continuous range of the variable assumed by the variable;
      (3) a mode converter for measuring said property from said detector; and
      (4) a signal generated by said mode converter representative of said current amount.

* * * * *